United States Patent
Akutsu

(10) Patent No.: US 10,749,777 B2
(45) Date of Patent: Aug. 18, 2020

(54) COMPUTER SYSTEM, SERVER MACHINE, PROGRAM, AND FAILURE DETECTION METHOD

(71) Applicant: NEC Corporation, Minato-ku, Tokyo (JP)

(72) Inventor: Takeshi Akutsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/919,464

(22) Filed: Mar. 13, 2018

(65) Prior Publication Data

US 2018/0287919 A1    Oct. 4, 2018

(30) Foreign Application Priority Data

Mar. 31, 2017    (JP) .................................. 2017-071765

(51) Int. Cl.

| | |
|---|---|
| H04L 12/26 | (2006.01) |
| G06F 9/455 | (2018.01) |
| H04L 12/24 | (2006.01) |
| H04L 12/46 | (2006.01) |

(52) U.S. Cl.
CPC ...... *H04L 43/0852* (2013.01); *G06F 9/45558* (2013.01); *H04L 41/064* (2013.01); *H04L 43/0817* (2013.01); *G06F 2009/45579* (2013.01); *G06F 2009/45591* (2013.01); *G06F 2009/45595* (2013.01); *H04L 12/4633* (2013.01); *H04L 43/06* (2013.01); *H04L 43/08* (2013.01)

(58) Field of Classification Search
CPC . H04L 43/0852; H04L 43/06; H04L 12/4633; H04L 43/08; G06F 9/45558; G06F 2009/45579; G06F 2009/45595; G06F 2009/45591
See application file for complete search history.

(56) References Cited

U.S. PATENT DOCUMENTS

| | | | | |
|---|---|---|---|---|
| 7,684,346 B2 * | 3/2010 | Valli | ....................... | H04L 43/10 370/252 |
| 7,978,630 B2 * | 7/2011 | Bengtsson | ........ | H04L 29/12471 370/254 |
| 7,983,173 B2 * | 7/2011 | Finn | .................... | H04L 41/0677 370/242 |

(Continued)

FOREIGN PATENT DOCUMENTS

| | | |
|---|---|---|
| JP | 2005-215857 A | 8/2005 |
| JP | 2007-122330 A | 5/2007 |

(Continued)

OTHER PUBLICATIONS

Shinbo et al., "A Detection Scheme for Service Abnormality based on User Actions in Mobile Core Network", IPSJ SIG Technical Reports, May 22, 2008, pp. 59-61, vol. 2008, No. 44, Information Processing Society of Japan, cited in JPOA.

(Continued)

*Primary Examiner* — Brian T O Connor

(57) ABSTRACT

For each combination of a connection destination device and a computer, a connection time of connection between the connection destination device and the computer is measured. Whether the operation of the connection destination device is normal is determined based on the result of the measurement.

15 Claims, 12 Drawing Sheets

(56) References Cited

U.S. PATENT DOCUMENTS

| | | | | |
|---|---|---|---|---|
| 8,023,432 | B2* | 9/2011 | Herzog | H04W 76/25 370/254 |
| 8,099,505 | B2* | 1/2012 | Tran | H04L 41/5019 709/227 |
| 10,044,581 | B1* | 8/2018 | Russell | H04L 43/08 |
| 2011/0286373 | A1* | 11/2011 | Herzog | H04L 61/2553 370/310 |
| 2013/0055031 | A1 | 2/2013 | Saito | |
| 2014/0298091 | A1* | 10/2014 | Carlen | H04L 65/80 714/15 |
| 2017/0344392 | A1* | 11/2017 | Ulatoski | G06F 9/45558 |
| 2018/0083828 | A1* | 3/2018 | Cartaya | H04L 41/12 |
| 2018/0375748 | A1* | 12/2018 | Russell | H04L 43/08 |

FOREIGN PATENT DOCUMENTS

| | | |
|---|---|---|
| JP | 2007-316837 A | 12/2007 |
| JP | 2013-045154 A | 3/2013 |

OTHER PUBLICATIONS

Japanese Office Action for JP Application No. 2017-071765 dated Feb. 14, 2018 with English Translation.

\* cited by examiner

| CONNECTION START | USER NAME | CONNECTION DESTINATION VIRTUAL PC | CONNECTION TIME | STATE |
|---|---|---|---|---|
| 5/1 9:00 | USER 1 | VIRTUAL PC 1 | 1 MINUTE | CONNECTION ENDED |
| 5/1 9:02 | USER 3 | VIRTUAL PC 1 | 2 MINUTES | CONNECTION ENDED |
| 5/1 9:03 | USER 2 | VIRTUAL PC 2 | 5 HOURS AND 30 MINUTES | CONNECTING |
| 5/1 10:13 | USER 3 | VIRTUAL PC 3 | 4 HOURS AND 20 MINUTES | CONNECTING |

|  | VIRTUAL PC 1 | VIRTUAL PC 2 | VIRTUAL PC 3 |
|---|---|---|---|
| USER 1 | 1 MINUTE |  |  |
| USER 2 |  | 5 HOURS AND 30 MINUTES |  |
| USER 3 | 2 MINUTES |  | 4 HOURS AND 20 MINUTES |

| ITEM | VALUE |
|---|---|
| MINIMUM USER COUNT | 2 |
| MAXIMUM CONNECTION TIME | 3 MINUTES |

| CONNECTION START | USER NAME | CONNECTION DESTINATION VIRTUAL PC | CONNECTION TIME | STATE |
|---|---|---|---|---|
| 5/1 9:00 | USER 2 | VIRTUAL PC 1 | 1 MINUTE | CONNECTION ENDED |
| 5/1 9:02 | USER 2 | VIRTUAL PC 3 | 2 MINUTES | CONNECTION ENDED |
| 5/1 9:03 | USER 1 | VIRTUAL PC 2 | 5 HOURS AND 30 MINUTES | CONNECTING |
| 5/1 10:13 | USER 3 | VIRTUAL PC 3 | 4 HOURS AND 20 MINUTES | CONNECTING |

|  | VIRTUAL PC 1 | VIRTUAL PC 2 | VIRTUAL PC 3 |
|---|---|---|---|
| USER 1 |  | 5 HOURS AND 30 MINUTES |  |
| USER 2 | 1 MINUTE |  | 2 MINUTES |
| USER 3 |  |  | 4 HOURS AND 20 MINUTES |

FIG. 8

| ITEM | VALUE |
|---|---|
| MINIMUM VIRTUAL PC COUNT | 2 |
| MAXIMUM CONNECTION TIME | 3 MINUTES |

| CONNECTION START | USER NAME | CONNECTION DESTINATION VIRTUAL PC | CONNECTION TIME | STATE |
|---|---|---|---|---|
| 5/1 9:00 | USER 2 | VIRTUAL PC 1 | 1 MINUTE | CONNECTION ENDED |
| 5/1 9:02 | USER 2 | VIRTUAL PC 2 | 1 MINUTE | CONNECTION ENDED |
| 5/1 9:03 | USER 1 | VIRTUAL PC 2 | 2 MINUTES | CONNECTION ENDED |
| 5/1 9:05 | USER 1 | VIRTUAL PC 3 | 1 HOUR | CONNECTION ENDED |
| 5/1 10:30 | USER 2 | VIRTUAL PC 3 | 5 HOURS AND 30 MINUTES | CONNECTING |
| 5/1 10:45 | USER 3 | VIRTUAL PC 1 | 2 MINUTES | CONNECTION ENDED |

|  | VIRTUAL PC 1 | VIRTUAL PC 2 | VIRTUAL PC 3 |
|---|---|---|---|
| USER 1 |  | 2 MINUTES | 1 HOUR |
| USER 2 | 1 MINUTE | 1 MINUTE | 5 HOURS AND 30 MINUTES |
| USER 3 | 2 MINUTES |  |  |

| | THIN CLIENT SERVER | STORAGE | NETWORK |
|---|---|---|---|
| VIRTUAL PC 1 | SERVER 1 | STORAGE 1 | NETWORK 1 |
| VIRTUAL PC 2 | SERVER 1 | STORAGE 1 | NETWORK 1 |
| VIRTUAL PC 3 | SERVER 2 | STORAGE 1 | NETWORK 1 |

| ITEM | VALUE |
|---|---|
| MINIMUM USER COUNT | 2 |
| MINIMUM VIRTUAL PC COUNT | 2 |
| MAXIMUM CONNECTION TIME | 3 MINUTES |

COMPUTER SYSTEM, SERVER MACHINE, PROGRAM, AND FAILURE DETECTION METHOD

This application is based upon and claims the benefit of priority from Japanese patent application No. 2017-071765, filed on Mar. 31, 2017, the disclosure of which is incorporated herein in its entirety by reference.

BACKGROUND OF THE INVENTION

1. Field of the Invention

The invention relates to detection of whether a computer system is operating normally, or failure detection and recovery from a failure.

2. Description of the Related Art

A type of computer system is configured so that resources connected to the computer system can be used from a plurality of end user terminals. One of the computer systems of this type is the thin client system. In the thin client system, only minimum functions are given to a terminal used by an end user, whereas almost all of the rest of processing procedures are executed on the server side. The thin client system has various modes.

A mode of the thin client system introduces a virtualization technology on the server side to virtually build a personal computer (PC) to be used by a user on a server. The PC virtually built in this mode is hereinafter referred to as "virtual PC". Examples of the thin client system include the "Virtual PC Center" by NEC Corporation, the "VMware Horizon" by VMware, Inc., and the "XenDesktop" by Citrix Systems, Inc.

The thin client system is capable of managing data in a consolidated manner on the server side, and accordingly has an advantage in that security including the prevention of information leakage can be enhanced. Another advantage of the thin client system, in which every virtual PC used by an end user is on the server side, is that the maintenance man-hour can be reduced.

The number of virtual PCs managed in a thin client system that is built with the use of a large-scale computer network can amount to several thousands to several ten thousands. In this case, a shared PC mode is often employed as a mode of the thin client system in order to reduce the maintenance man-hour, in particular. The shared PC mode is, as the name implies, a mode in which the use of one virtual PC is shared by a plurality of end users. In the shared PC mode, it is not required to prepare a virtual PC for each end user, and the overall number of virtual PCs prepared by the system can accordingly be reduced. The maintenance man-hour is reduced as a result. When one virtual PC is shared as it is by a plurality of end users, every end user is uniformly subjected to the same environment regardless of the specifics of the user's work or the user's preferences. A single desktop environment, for example, the desktop wallpaper and the types and positions of icons arranged on the desktop, is forced upon every end user who uses the same virtual PC.

In order to eliminate such inconveniences, some shared PC-mode thin client systems create customization information (hereinafter referred to as "user environment") for each end user in advance, read the customization information of an end user at the time the end user logs in to a virtual PC, and apply the read customization information to the virtual PC. An administrator of this type of thin client system is required to manage as many user environments as the number of users in addition to several thousand to several ten thousand virtual PCs.

In Japanese Unexamined Patent Application Publication JP 2007-316837 A, there is disclosed a system in which a load balancing device including a failure detection unit for detecting a failure in a front end server is included in order to detect a failure. The failure detection unit provided in the load balancing device transmits a request message to the front end server and, when no response is received within a given length of time, determines that a failure has occurred in the front end server.

In Japanese Unexamined Patent Application Publication JP 2007-122330 A, there is disclosed accurate detection of only an abnormal node out of a plurality of nodes forming a cluster in a cluster system that includes a plurality of nodes. According to Japanese Unexamined Patent Application Publication JP 2007-122330 A, a failure detection unit is provided in each node for which a failure is to be detected. A node that has detected a failure in itself notifies a failure monitoring node.

A case is discussed in which a method similar to Japanese Unexamined Patent Application Publication JP 2007-316837 A is applied to the detection of a failure in a virtual PC or other connection destination devices. In this case, a failure can be detected only when the operation of a part of a connection destination device including a particular portion, or the operation of the entire connection destination device, is delayed or stopped.

Application of the method described in Japanese Unexamined Patent Application Publication JP 2007-316837 A means that a virtual PC is provided with a response unit, which responds to the request message from the failure detection unit. Pieces of software run on the virtual PC in this case include application software to be used by a user. When a failure occurs only in some of the pieces of software on the virtual PC, the rest of the pieces of software including the response unit operate normally. The failure detection unit in this situation may erroneously determine that the entire virtual PC is operating normally.

In Japanese Unexamined Patent Application Publication JP 2007-122330 A, it is required to provide the failure detection unit in every node that is a target of failure detection. When each node is made up of a plurality of components and it is required to identify a failed component, in particular, the failure detection unit is required to be provided for each component.

In any case, Japanese Unexamined Patent Application Publication JP 2007-316837 A and Japanese Unexamined Patent Application Publication JP 2007-122330 A have no consideration for application to a computer system that includes a virtual PC, and the application of Japanese Unexamined Patent Application Publication JP 2007-316837 A or Japanese Unexamined Patent Application Publication JP 2007-122330 A to the computer system creates the inconveniences described above.

Each virtual PC provided on the thin client server side in which virtual PCs are included is hereinafter referred to as "connection destination device", and a terminal on the end user side is referred to as "user terminal" or "client terminal", or simply as "terminal". The terms "user terminal", "client terminal", and "terminal" used herein do not always mean terminals operated by a person, and may refer to a terminal used in the Internet of Things (IoT) without human intervention.

SUMMARY OF THE INVENTION

The invention has been made in view of the situation described above, and it is an object to be attained by the invention to provide a computer system, a failure detection method, and a program in which a malfunction or a failure in some of functions of a connection destination device can be detected before the connection destination device completely shuts down.

It is another object to be attained by the invention to provide a computer system, a failure detection method, and a program in which a failure in a connection destination device can be detected without providing a failure detection unit in each of a plurality of connection destination devices.

As an aspect of the invention, a computer system, comprising: connection destination devices; a terminal to be connected to one of the connection destination devices to use a function of the one of the connection destination devices; a measurement device configured to measure, for each combination of one of the connection destination devices and the terminal, a connection time of connection between the one of the connection destination devices and the terminal, to store the connection time in a storage device; and a determination device configured to determine whether operation of one of the connection destination devices is normal based on the connection time stored in the storage device is provided.

As another aspect of the invention, a server machine, comprising: a measurement device configured to measure, for each combination of one of connection destination devices and a terminal, a connection time of connection between the one of the connection destination devices and the terminal, to store the connection time in a storage device, the terminal being connected to one of the connection destination devices to use a function of the one of the connection destination devices; and a determination device configured to determine whether operation of one of the connection destination devices is normal based on the connection time stored in the storage device is provided.

As another aspect of the invention, a failure detection method, comprising: measuring, for each combination of one of connection destination devices and the terminal, a connection time of connection between the one of the connection destination devices and the terminal, to store the connection time in a storage device in advance, the terminal being connected to one of the connection destination devices to use a function of the one of the connection destination devices; and determining, by a processing device, whether operation of one of the connection destination devices is normal based on the connection time stored in the storage device is provided.

According to the invention, the fact that a monitoring target is not operating normally can be detected before the entire monitoring target completely shuts down, that is, at the time a malfunction or a failure occurs in some of functions of the monitoring target. With the invention applied to a screen image transfer thin client system, the soundness of the system can therefore be checked easily.

In addition, according to the invention, whether the operation of a monitoring target is normal can be determined on monitoring target-by-monitoring target basis without providing a monitoring unit for each monitoring target.

BRIEF DESCRIPTION OF THE DRAWINGS

FIG. 2 is an example of a connection history table 2310 of the computer system 1.

FIG. 3 is an example of a connection time management table 4310 of the computer system 1.

FIG. 4 is an example of a parameter table 4320 of the computer system 1.

FIG. 7 is an example of a connection history table 2320 of the computer system 2.

FIG. 8 is an example of a connection time management table 4330 of the computer system 2.

FIG. 9 is an example of a parameter table 4340 of the computer system 2.

FIG. 13 is an example of a connection history table 2330 of the computer system 3.

FIG. 14 is an example of a connection time management table 4350 of the computer system 3.

FIG. 15 is an example of an association management table 4360 of the computer system 3.

FIG. 16 is an example of a parameter table 4370 of the computer system 3.

DESCRIPTION OF THE EMBODIMENTS

Figure 18:
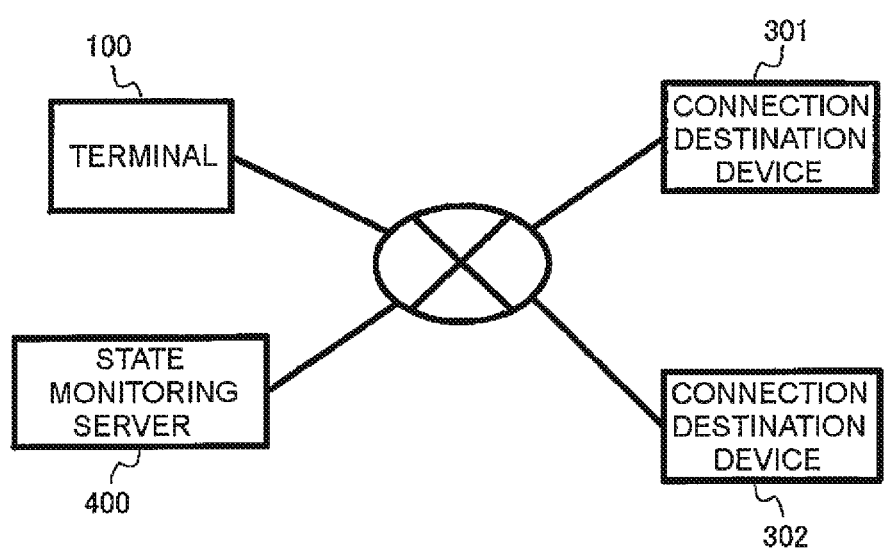
FIG. 18 is a block diagram for illustrating the principle of the invention.

The principle of the invention is described first with reference to FIG. 18. A computer system 4 according to the principle of the invention includes a terminal 100, connection destination devices 301 and 302, and a state monitoring server 400. The terminal 100 is connected to, for example, the connection destination device 301 to use functions of the connection destination device 301. The state monitoring server 400 includes a unit for measuring connection times each of which indicates the duration of connection between the user terminal 100 and one of the connection destination devices 301, 302. The state monitoring server 400 includes a storage device for storing measured connection times. The state monitoring server 400 further includes a processing device, which determines whether the operation of the connection destination device is normal based on the connection time stored in the storage device.

First Embodiment

A computer system 1 according to an embodiment of the invention is described. In a first embodiment of the invention, whether a virtual PC run on a thin client server is operating normally is determined and, when the operation of the virtual PC is determined as abnormal, the virtual PC is automatically recreated on the thin client server. The length of time since the start of one session of connection between a terminal and a virtual PC on a thin client server till the end of the session is called herein a connection time, and whether the virtual PC is operating normally is determined based on the connection time.

Figure 1:
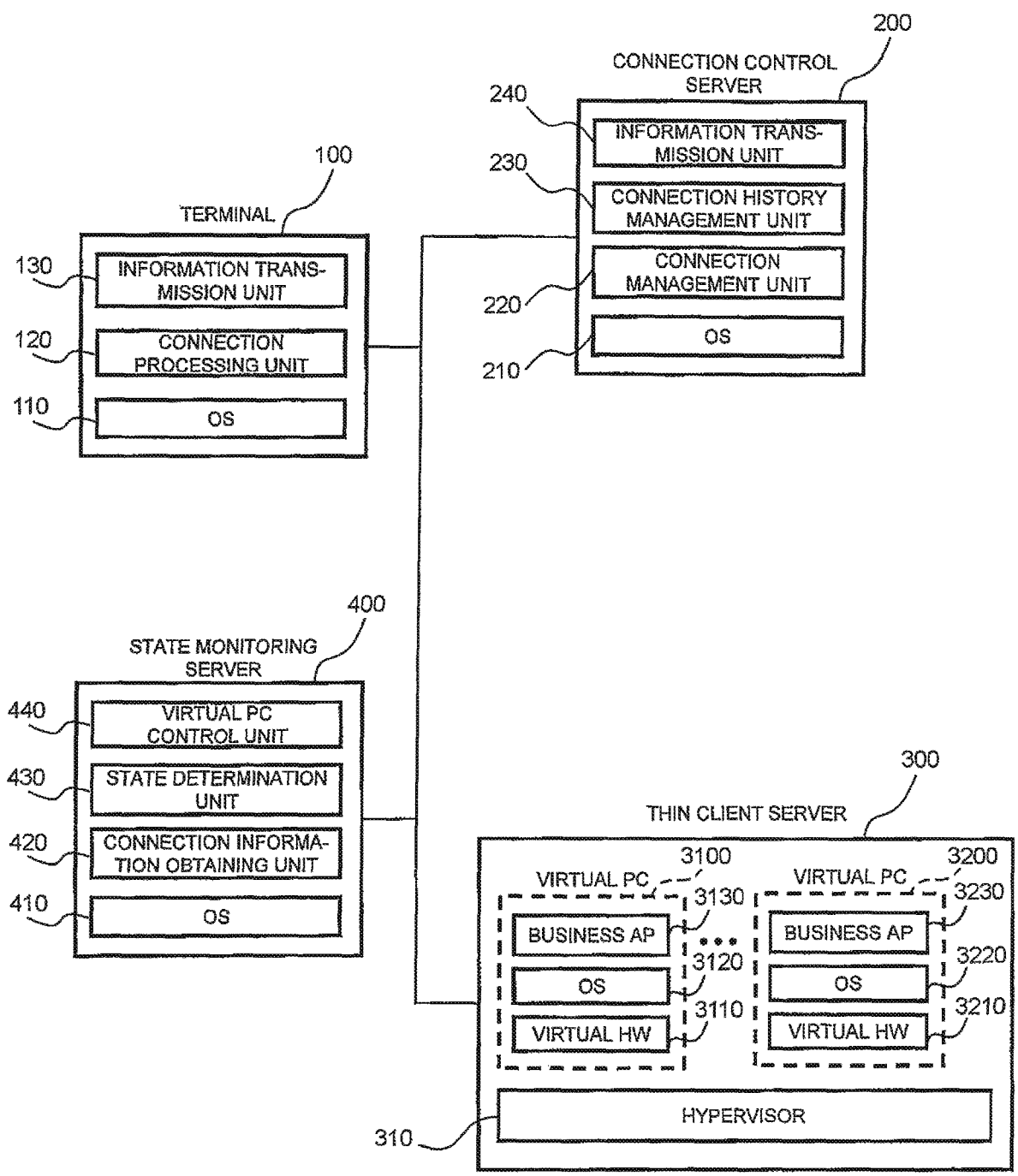
FIG. 1 is a block diagram of a computer system 1 according to a first embodiment of the invention.

Referring to FIG. 1, the computer system 1 includes a terminal 100, a connection control server 200, a thin client server 300, and a state monitoring server 400. The terminal 100, the connection control server 200, the thin client server 300, and the state monitoring server 400 each include a data communication interface device, for example, a local area network (LAN) card device, to allow data communication among the terminal and the servers over a LAN. The LAN can use a wired transmission medium or a wireless transmission medium.

The terminal 100 is a computer operating under control of a program. An operating system (OS) 110 runs on the terminal 100. A connection processing unit 120 and an information transmission unit 130 operate on the OS 110.

The connection processing unit 120 has a function of connecting the terminal 100 to a virtual PC on the thin client server 300 based on connection destination information, which is transmitted from the connection control server 200. The connection processing unit 120 also has a function of instructing the information transmission unit 130 to execute processing in order to send to the connection control server 200 information indicating a change in session situation, for example, the cutting off of a session of connection to a virtual PC by an end user.

The information transmission unit 130 operates upon instruction from the connection processing unit 120, and has a function of transmitting information to the connection control server 200.

The connection control server 200 is a computer operating under control of a program.

An operating system (OS) 210 runs on the connection control server 200. A connection management unit 220, a connection history management unit 230, and an information transmission unit 240 operate on the OS 210. The connection control server 200 holds a connection history table 2310 (see FIG. 2) in the connection history management unit 230.

The connection management unit 220 operates upon reception of information from the information transmission unit 130 of the terminal. The connection management unit 220 has a function of selecting a virtual PC to which the terminal 100 is to be connected, out of virtual PCs 3100 and 3200 on the thin client server 300. The connection management unit 220 has a function of instructing the information transmission unit 240 to execute processing in order to transmit connection destination information to the terminal 100. The connection destination information is information indicating which virtual PC is selected by the connection management unit 220. The connection management unit 220 also has a function of instructing the connection history management unit 230 to execute processing of updating the connection history table 2310, which is described later.

The connection history management unit 230 operates upon instruction from the connection management unit 220, and holds the history of connection information. To hold the history information, the connection history management unit 230 has the right to access the connection history table 2310. The connection history management unit 230 has a function of instructing the information transmission unit 240 to execute processing in order to transmit the connection history information to the state monitoring server 400.

The connection history table 2310 is a table for managing connection information. The connection information is information about connection between the terminal and a virtual PC. In the example of FIG. 2, User 1 begins connection to Virtual PC 1 at 9:00 on May 1st, the connection time is 1 minute (that is, the connection is ended at 9:01 on May 1st), and the connection is already finished at present.

The information transmission unit 240 operates upon instruction from the connection management unit 220 and instruction from the connection history management unit 230, and has a function of transmitting information to the terminal 100 or the state monitoring server 400.

The thin client server 300 is a computer operating under control of a program. A hypervisor 310 runs on the thin client server 300. The hypervisor 310 is software required to run a virtual machine (VM). The hypervisor 310 has a function of allocating resources of the server 300, for example, a central processing unit (CPU) and a memory, to respective VMs.

The VMs 3100 and 3200, namely, virtual PCs 3100 and 3200, are logical machines run on the hypervisor 310 and emulate physical machines. Specifically, the VMs 3100 and 3200 have an environment in which virtual hardware (HW) 3110 and virtual HW 3210 are installed in the VM 3100 and the VM 3200, respectively, an OS 3120 and an OS 3220 run on the HS 3110 and the HW 3210, respectively, and business application software (AP) 3130 and business AP 3230 run on the OS 3210 and the OS 3220, respectively. While two virtual PCs 3100 and 3200 operate on the hypervisor 310 in FIG. 1, three or more virtual PCs may operate on the hypervisor 310 depending on how many resources the thin client server 300 has. All virtual PCs created or recreated by the hypervisor 310 are equivalent to one another in the first embodiment. In other words, the hypervisor 310 allocates an equal quantity of processor resources and memory resources to each logical machine.

The state monitoring server 400 illustrated in FIG. 1 is a computer operating under control of a program. An operating system (OS) 410 runs on the state monitoring server 400. A connection information obtaining unit 420, a state determination unit 430, and a virtual PC control unit 440 operate on the OS 410. The state monitoring server 400 holds a connection time management table 4310 (FIG. 3) and a parameter table 4320 (FIG. 4) in the state determination unit 430.

The connection information obtaining unit 420 operates upon instruction from the state determination unit 430, and has a function of obtaining the connection history information from the connection control server 200.

The state determination unit 430 has a function of identifying a virtual PC, a user environment, or other components that are not working properly, based on information in the connection time management table 4310 and the parameter table 4320. The state determination unit 430 also has a function of instructing the connection information obtaining unit 420 to execute processing in order to create the connection time management table 4310. The state determination unit 430 also has a function of instructing the virtual PC control unit 440 to execute processing in order to recreate a virtual PC. The state determination unit 430 has the right to access the connection time management table 4310 and the parameter table 4320.

The virtual PC control unit 440 operates upon instruction from the state determination unit 430, and has a function of instructing the thin client server 300 to recreate a particular virtual PC.

The operation of the illustrated computer system 1 is described with reference to FIG. 1 to FIG. 4.

The premise of the description given here is that the connection history table 2310 shown in FIG. 2 is stored in the connection history management unit 230, while the connection time management table 4310 shown in FIG. 3 and the parameter table 4320 shown in FIG. 4 are stored in the state determination unit 430.

The state determination unit 430 of the state monitoring server 400 creates the connection time management table 4310 shown in FIG. 3, based on information in the connection history table 2310 of the connection control server 200. The connection time management table 4310 indicates which end user has connected to which virtual PC for how many minutes. When the same end user connects to the same virtual PC more than once, information about the latest (last) connection is used in the creation of the connection time management table 4310. For example, a reference to FIG. 3 informs that User 2, who is an end user, has connected to Virtual PC 2 for 5 hours and 30 minutes.

FIG. 4 is an example of the parameter table 4320, which is provided in the state determination unit 430 of FIG. 1. The parameter table 4320 shown in FIG. 4 indicates conditions for determining a virtual PC that is not operating normally. Set values of the minimum user count and the maximum connection time are given here as parameters.

Specifically, a set value "2" of the minimum user count in the parameter table 4320 of FIG. 4 indicates a condition that there be at least two users whose connection time is recorded in one column of the connection time management table 4310. A threshold "3 minutes" for the maximum connection time in the parameter table 4320 of FIG. 4 indicates a condition that the maximum connection time recorded in one column of the connection time management table 4310 be 3 minutes or less.

An example is given in which states shown in FIG. 2 are determined based on the parameter table 4320 of FIG. 4 and the connection time management table 4310 of FIG. 3. There are two users, namely, User 1 and User 3, whose connection time is recorded in the column for Virtual PC 1 as shown in FIG. 2. The connection time of one user, namely, User 2, is recorded in the column for Virtual PC 2. The connection time of one user, namely, User 3, is recorded in the column for Virtual PC 3. Accordingly, only Virtual PC 1 fulfills the minimum user count condition, namely, "2", in the parameter table 4320 of FIG. 4.

Taking this into account, the state determination unit 430 determines whether Virtual PC 1 fulfills the condition about the threshold "3 minutes" for the maximum connection time in the parameter table 4320 of FIG. 4. The connection time for which User 1 has connected to Virtual PC 1 is 1 minute and the connection time for which User 3 has connected to Virtual PC 1 is 2 minutes according to the connection time management table 4310 of FIG. 3, and the maximum connection time recorded in the connection time management table 4310 is accordingly 2 minutes. This maximum connection time meets the condition about the threshold "3 minutes" for the maximum connection time in the parameter table 4320 of FIG. 4. The state determination unit 430 in this case determines that, out of Virtual PC 1, Virtual PC 2, and Virtual PC 3, Virtual PC 1 meets all conditions indicated by the parameter table 4320 of FIG. 4. In other words, the state determination unit 430 determines that Virtual PC 1 is not operating normally.

Figure 5:
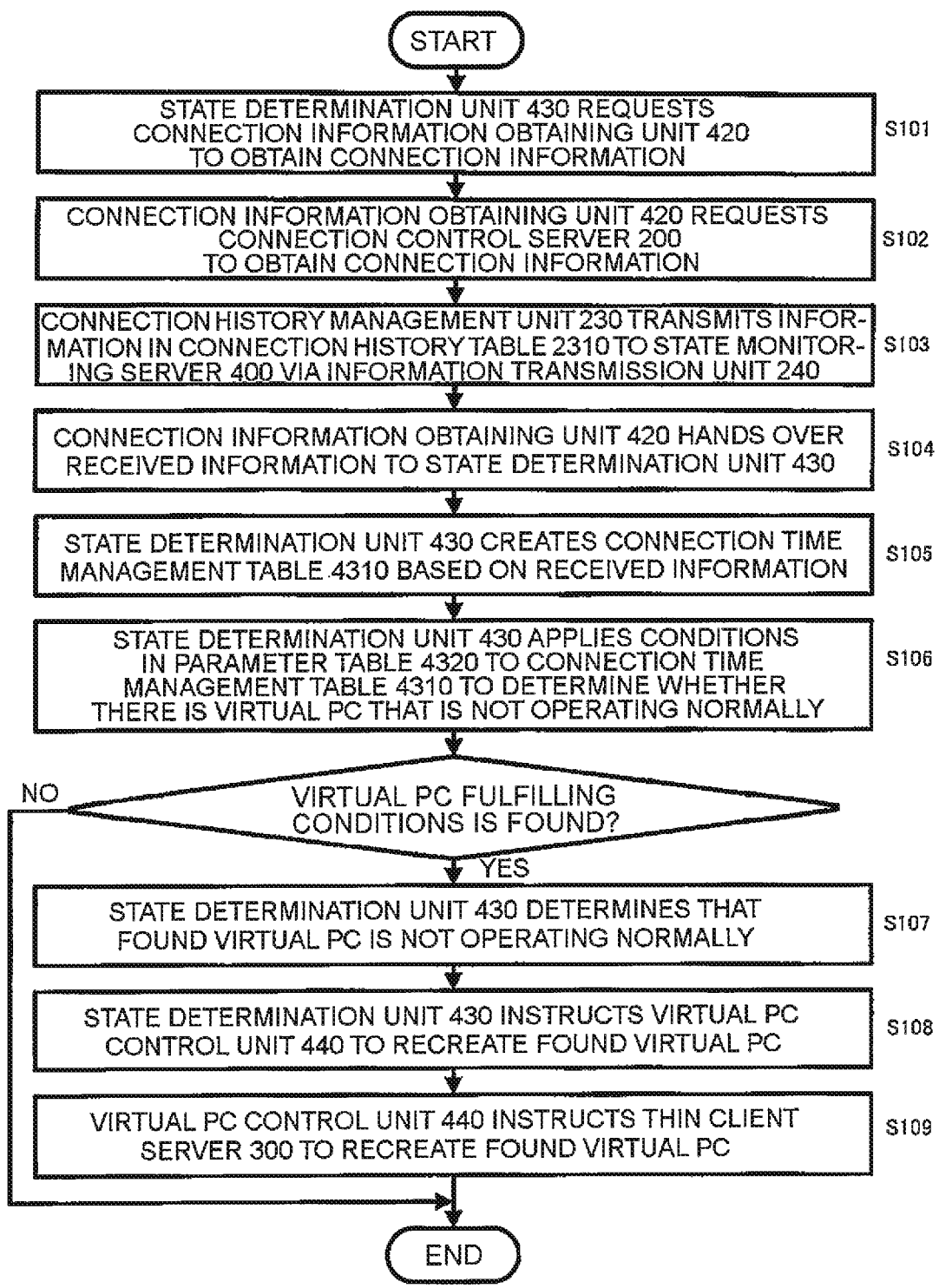
FIG. 5 is a flow chart for illustrating the operation of the computer system 1.

A further detailed description is given on the operation of the computer system 1 with reference to FIG. 5. This operation is executed for every given period of time.

First, the state determination unit 430 in the state monitoring server 400 requests the connection information obtaining unit 420 to obtain the connection information (Step S101). The connection information obtaining unit 420 requests the connection control server 200 to obtain the connection information (Step S102).

The connection history management unit 230 in the connection control server 200 receives the connection information obtaining request. The connection history management unit 230 transmits information in the connection history table 2310 to the state monitoring server 400 via the information transmission unit 240 (Step S103).

The connection information obtaining unit 420 in the state monitoring server 400 receives the connection information. The connection information obtaining unit 420 hands over the received connection information to the state determination unit 430 (Step S104). The state determination unit 430 uses the received connection information to create or update the connection time management table 4310 (Step S105). The creation or update of the connection time management table 4310 is executed for each combination of an end user and a virtual PC.

When it is the case that the last connection is already ended, the state determination unit 430 stores, as a connection time, the time elapsed since the start of the last connection till the end of the last connection in a relevant cell in the connection time management table 4310. When it is the case that the last connection is currently ongoing, the state determination unit 430 stores, as a connection time, the time elapsed since the start of the last connection to the present in a relevant cell in the connection time management table 4310.

An example is given in which the connection control server 200 is currently holding the connection history table 2310 exemplified in FIG. 2 in the connection history management unit 230. The connection time management table 4310 updated based on the connection history table 2310 of FIG. 2 in this case is as shown in FIG. 3. Virtual PC 1 is registered in the connection history table 2310 of FIG. 2 as a connection destination virtual PC for User 1, and User 1's connection time of the connection to Virtual PC 1 is 1 minute. Accordingly, "1 minute" is written to a cell for Virtual PC 1 and no values are written to other cells in a row for User 1 in the connection time management table 4310 of FIG. 3. Similarly, "5 hours and 30 minutes" is written in the connection history table 2310 of FIG. 2 as User 2's connection time for connection to Virtual PC 2, and "5 hours and 30 minutes" is accordingly written to a cell for Virtual PC 2 in a row for User 2 in the connection time management table 4310 of FIG. 3, while no values are written to other cells in the row. In the case of User 3, "2 minutes" is written as the connection time of connection to Virtual PC 1 and "4 hours and 20 minutes" is written as the connection time of connection to Virtual PC 3 in the connection history table 2310 of FIG. 2. Accordingly, "2 minutes" is written to a cell for Virtual PC 1 and "4 hours and 20 minutes" is written to a cell for Virtual PC 3 in a row for User 3 in the connection time management table 4310 of FIG. 3.

The state determination unit 430 determines whether there is a virtual PC that is not operating normally by checking information of the connection time management table 4310 created in Step S105 against conditions written in the parameter table 4320 (Step S106).

It is determined that a virtual PC that fulfills all conditions written in the parameter table 4320 is not operating normally (Step S107).

Generally speaking, an end user is unlikely to keep using a virtual PC that is having trouble or does not operate normally for long, and rather ends the use of a virtual PC having such problems quickly. It can therefore be considered that the connection time of connection to a virtual PC that is not operating normally is shorter than the connection time of connection to a virtual PC that is operating normally. The first embodiment focuses on this pattern of usage of virtual PCs.

When short connection times concentrate on connection to a particular virtual PC, the state determination unit 430 determines in Step S107 that the virtual PC is not operating normally.

When values currently stored in the connection time management table 4310 are ones in FIG. 3, two users, namely, User 1 and User 3, have connected to Virtual PC 1 for a connection time that is 2 minutes or less, according to the connection time management table 4310. Virtual PC 1 accordingly fulfills both conditions written in the parameter table 4320, namely, the condition that there be at least two users whose connection time is recorded (corresponding to the minimum user count "2"), and the condition that the longest of the users' connection times is 3 minutes of less (corresponding to the maximum connection time "3 minutes"). The state determination unit 430 therefore determines that Virtual PC 1 is not operating normally.

When there is a virtual PC that is not operating normally, the state determination unit 430 instructs the virtual PC control unit 440 to recreate the virtual PC (Step S108). The virtual PC control unit 440 instructs the thin client server 300 to recreate the virtual PC (Step S109). In response to the instruction, the hypervisor 310 recreates the virtual PC.

The determination in Step S107 is based on the length of the connection time of an end user. This may cause the state determination unit 430 to erroneously determine that a virtual PC that is operating normally in actuality is operating abnormally in some cases. However, recreation of a virtual PC that is determined as a PC operating abnormally but actually has no problems does not have an adverse effect because each virtual PC created by the hypervisor 310 is allocated the same quantity of resources as described above.

When no virtual PC is found in Step S106 that fulfills all conditions written in the parameter table 4320, the flow is ended.

As described above, according to the first embodiment, a system can automatically identify and repair a virtual PC that is not operating normally in an end user's view, without waiting for an explicit request from the end user. An end user of a thin client system generally tends to cut off connection to a virtual PC that is operating differently from normal and then reconnect to the virtual PC. Connection to a virtual PC that is not operating normally therefore ends in a short time in most cases, whoever the user is. The first embodiment involves determining a virtual PC that is not operating normally based on this finding.

In the first embodiment, every virtual PC created or recreated by the hypervisor 310 is equivalent to another created or recreated virtual PC in order to simplify the description about the recreation of a virtual PC in Step S109. The first embodiment may be modified so that the quantity of resources to be allocated may be determined for each virtual PC separately. In this case, the hypervisor 310 creates a virtual PC to which the same quantity of resources as that of a virtual PC that is not operating normally is allocated. The values shown in FIG. 4 as the minimum user count and the maximum connection time can be changed as required.

Second Embodiment

A computer system 2 according to a second embodiment of the invention is described. In the computer system 2, blocks having functions that correspond to the functions of the blocks in the computer system 1 are denoted by the same reference symbols. A description on a block of the computer system 2 that operates the same way as a corresponding block in the computer system 1 may be omitted.

Figure 6:
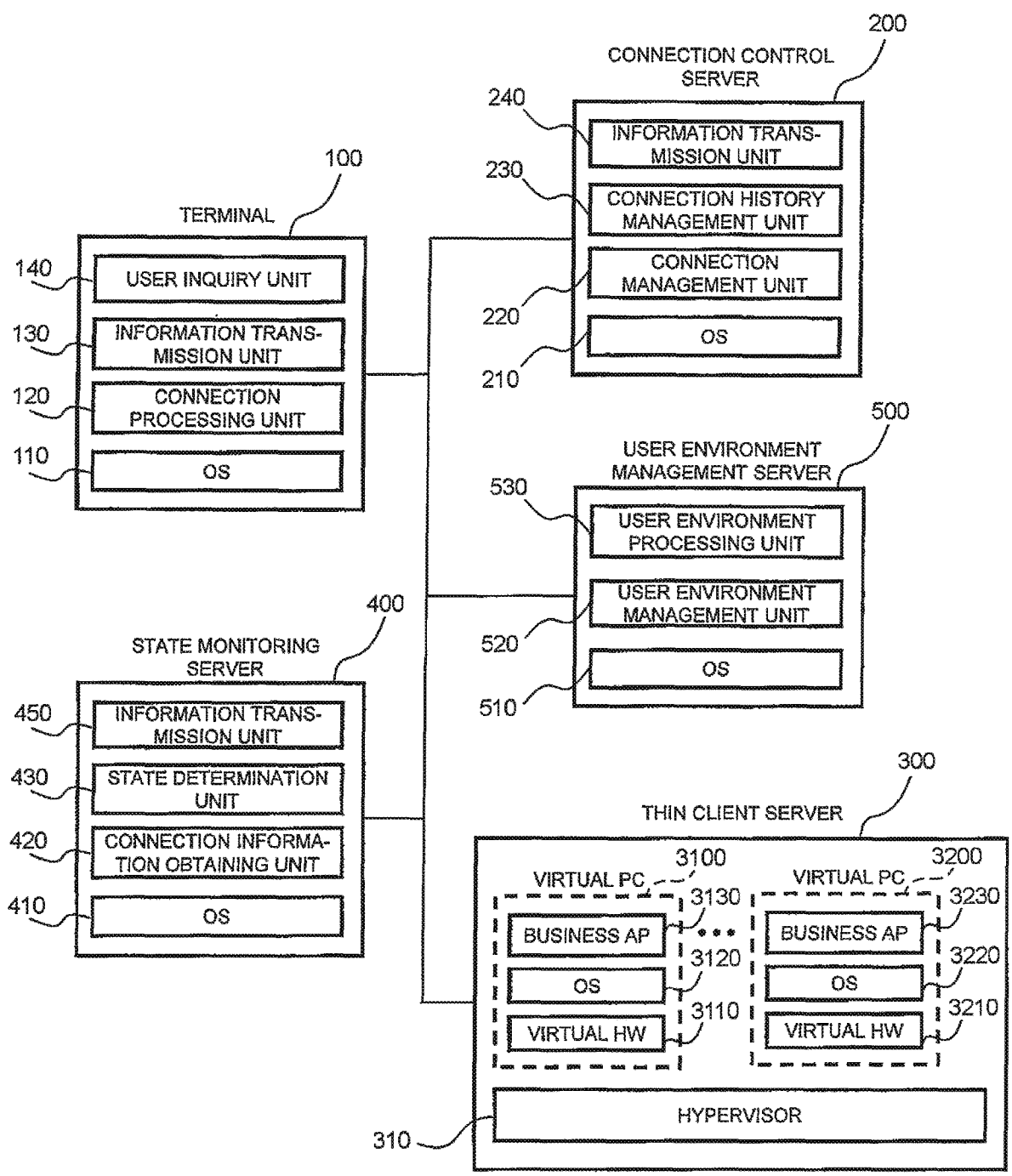
FIG. 6 is a block diagram of a computer system 2 according to a second embodiment of the invention.

Referring to FIG. 6, the computer system 2 includes the terminal 100, the connection control server 200, the thin client server 300, the state monitoring server 400, and a user environment management server 500. The computer system 2 differs from the computer system 1 particularly in that the user environment management server 500 is included.

The information transmission unit 130 of the terminal 100 operates upon instructions from the connection processing unit 120 and instruction from a user inquiry unit 140. The information transmission unit 130 has a function of transmitting information to the connection control server 200 and the user environment management server 500.

The illustrated user inquiry unit 140 operates upon reception of information from an information transmission unit 450. The user inquiry unit 140 has a function of making an inquiry to a user about whether to initialize the user environment. The user inquiry unit 140 also has a function of instructing, when the user determines that the initialization is to be conducted, the information transmission unit 130 to execute processing in order to request the initialization processing from the user environment management server 500.

The connection control server 200 holds a connection history table 2320 as information in the connection history management unit 230. The connection history table 2320 is information for managing connection information about connection from the terminal 100 to the virtual PCs 3100 and 3200. According to the connection history table 2320 of FIG. 7, User 2 begins connection to Virtual PC 1 at 9:00 on May 1st, the connection time is 1 minute (that is, the connection is ended at 9:01 on May 1st), and the connection is already finished at present.

The state monitoring server 400 holds information in the state determination unit 430. The held information includes information stored in a connection time management table 4330 (FIG. 8) and in a parameter table 4340 (FIG. 9). The state determination unit 430 has a function of identifying a virtual PC, a user environment, or other components that are not working properly, based on information in the connection time management table 4330 and the parameter table 4340. The state determination unit 430 also has a function of instructing the connection information obtaining unit 420 to execute processing in order to create the connection time management table 4330. The state determination unit 430 also has a function of instructing the information transmission unit 450 to execute processing in order to make an inquiry to a user about whether to initialize the user environment. The state determination unit 430 has the right to access the connection time management table 4330 and the parameter table 4340.

The information transmission unit 450 operates upon instruction from the state determination unit 430, and has a function of transmitting information to the user terminal 100.

The user environment management server 500 is a computer operating under control of a program. An operating system (OS) 510 runs on the user environment management server 500. A user environment management unit 520 and a user environment processing unit 530 operate on the OS 510. The user environment management unit 520 has a function of managing user environment information of each end user. The user environment processing unit 530 operates upon instruction from the user terminal 100, and has a function of initializing the user environment.

The connection time management table 4330 is created by the state determination unit 430 based on information in the connection history table 2320. The connection time management table 4330 indicates which end user has connected to which virtual PC for how many minutes. When one end user connects to the same virtual PC more than once, the latest information (information about the last connection) is used in the creation of the connection time management table 4330. For example, a reference to FIG. 8 informs that User 1 has connected to Virtual PC 2 for 5 hours and 30 minutes.

The parameter table 4340 shown in FIG. 9 is a table for writing a condition under which the user environment that does not work properly. When a virtual PC meets all conditions written in the parameter table 4340, the state determination unit 430 determines that the virtual PC is not operating normally.

In the parameter table 4340 of FIG. 9, a set value "2" of the minimum virtual PC count indicates a condition that there be at least two virtual PCs for which connection time is recorded in the connection time management table 4330 with respect to one user. A set value "3 minutes" of the maximum connection time indicates a condition that the longest connection time recorded in the connection time management table 4330 with respect to one user be 3 minutes or less.

A description is given by taking as an example a case in which conditions defined in the parameter table 4340 of FIG. 9 are applied to the connection time management table 4330 of FIG. 8. The number of virtual PCs for which the connection time is recorded in the connection time management table 4330 of FIG. 8 is one (Virtual PC 2) in the case of User 1, two (Virtual PC 1 and Virtual PC 3) in the case of User 2, and one (Virtual PC 3) in the case of User 3. Only User 2 accordingly fulfills the condition about the minimum virtual PC count.

The connection time of User 2 is 1 minute in the connection to Virtual PC 1, and 2 minutes in the connection to Virtual PC 3. The maximum connection time of User 2 is accordingly 2 minutes. This value of the maximum connection time is less than 3 minutes, which is a threshold defined for the maximum connection time in the parameter table 4340 of FIG. 9. The state determination unit 430 thus determines that the user environment of User 2 is not proper when conditions defined in the parameter table 4340 of FIG. 9 are applied to the connection time management table 4330 of FIG. 8.

Figure 10:
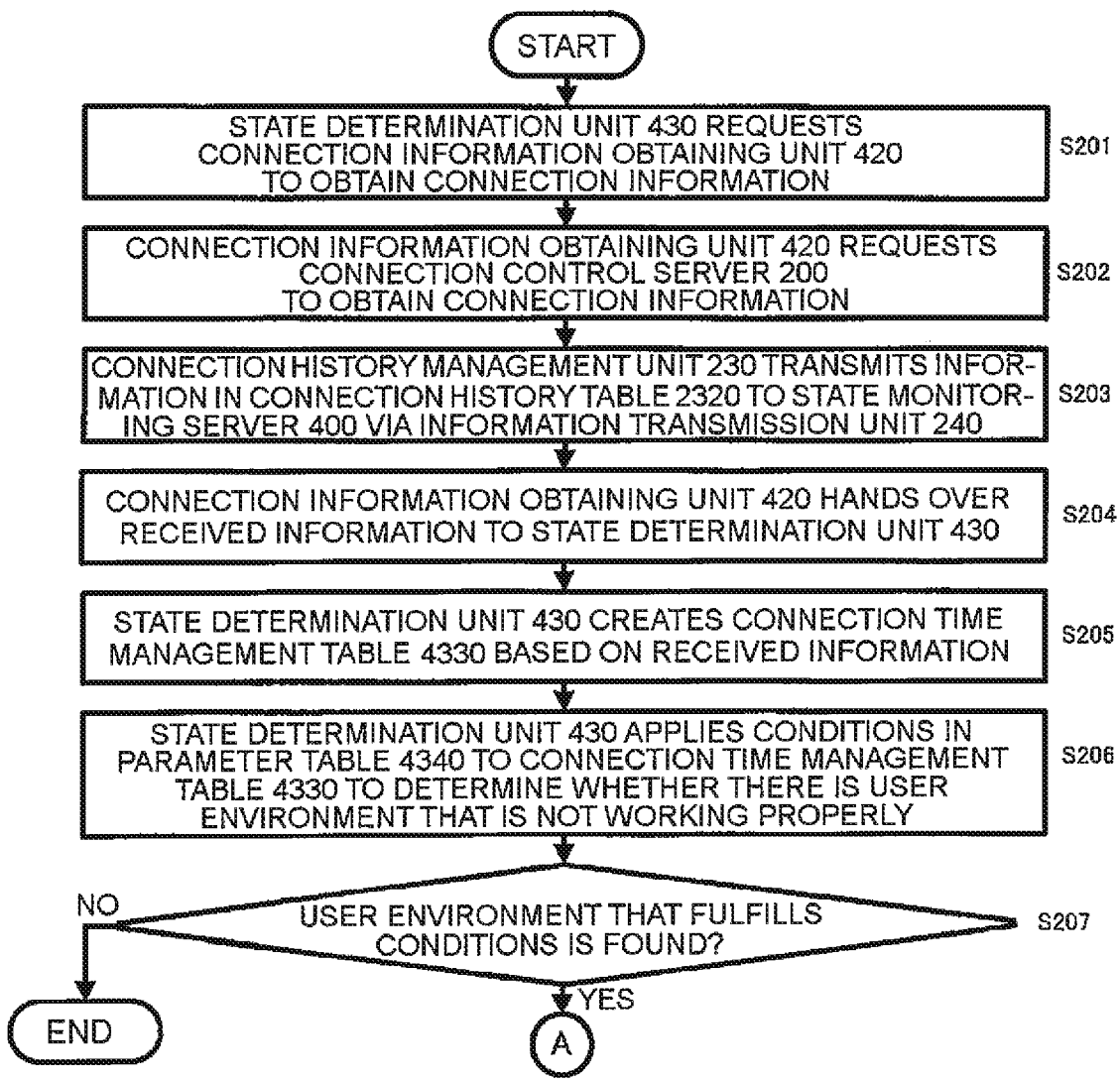
FIG. 10 is a flow chart for illustrating the operation of the computer system 2.
Figure 11:
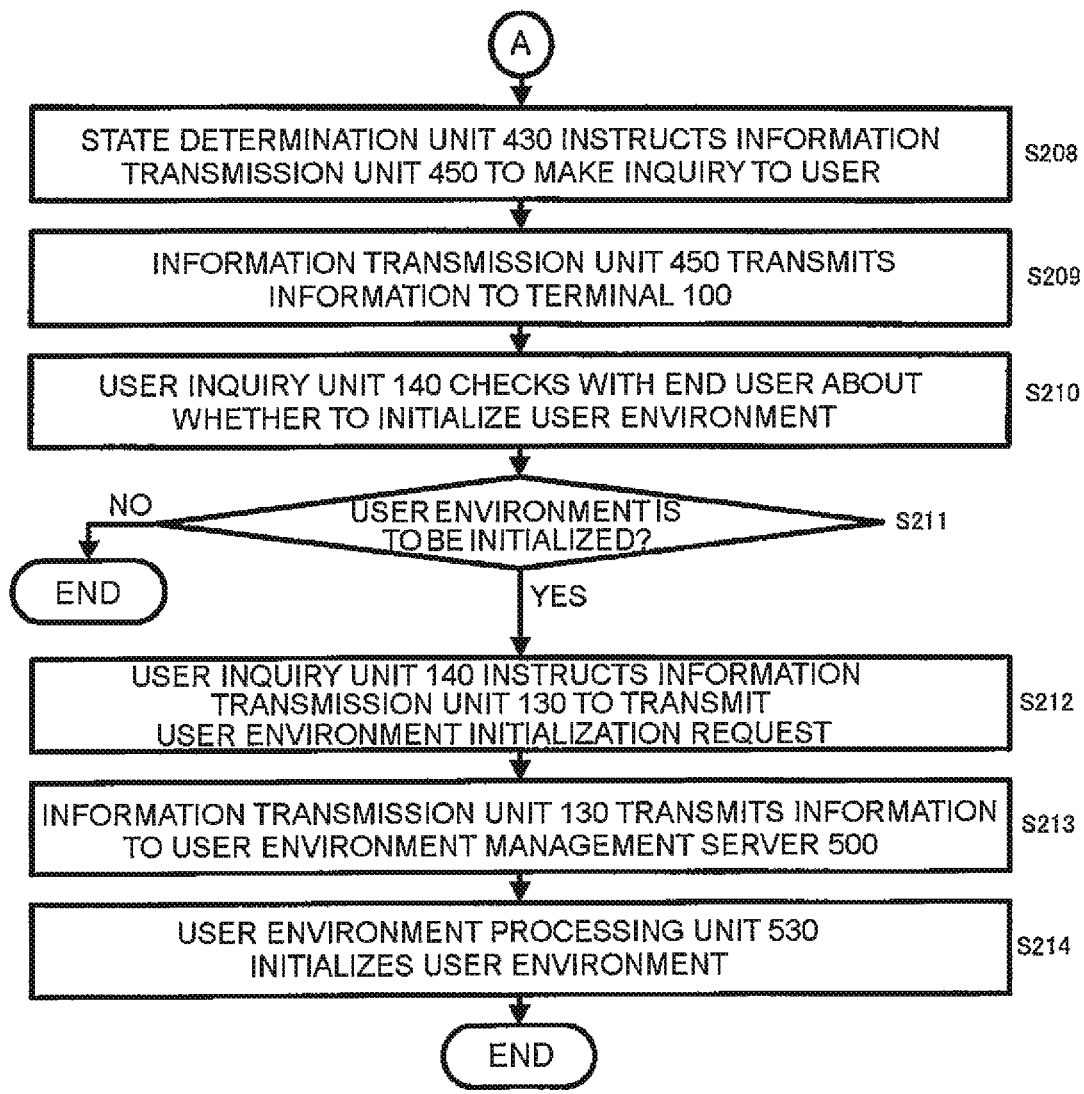
FIG. 11 is a flow chart for illustrating the operation of the computer system 2 that is continued from the flow chart of FIG. 10.

The operation of the computer system 2 is described with reference to FIG. 10 and FIG. 11. The computer system 2 executes the operation described below for every given period of time.

The state determination unit 430 in the state monitoring server 400 requests the connection information obtaining unit 420 to obtain the connection information (Step S201). The connection information obtaining unit 420 requests the connection control server 200 to obtain the connection information (Step S202).

The connection information obtaining request is received by the connection history management unit 230 of the connection control server 200. The connection history management unit 230 transmits information in the connection history table 2320 (the connection information) to the state monitoring server 400 via the information transmission unit 240 (Step S203).

The connection information is received by the connection information obtaining unit 420 of the state monitoring server 400. The connection information obtaining unit 420 hands over the received connection information to the state determination unit 430 (Step S204). The state determination unit 430 uses the received connection information to create the connection time management table 4330 (Step S205). The state determination unit 430 creates the connection time management table 4330 by registering, for each combination of an end user and a virtual PC, the connection time of the last connection made by the user to the virtual PC.

The state determination unit 430 refers to information in the connection time management table 4330 created in Step S205 to check for a user environment that is determined as improper from the conditions written in the parameter table 4340 (Step S206).

An end user who uses a user environment that is not proper is likely to connect to any virtual PC for a short connection time. In view of this, the second embodiment involves determining whether a user environment is proper. When one end user connects to a plurality of virtual PCs (corresponding to the minimum virtual PC count in the parameter table 4340) and the connection time is short (corresponding to the maximum connection time in the parameter table 4340) for any of the virtual PCs, it is determined that the user environment of the end user is not proper (Step S207).

An example is given in which the determination is made by applying the parameter table 4340 of FIG. 9 to the connection time management table 4330 of FIG. 8. User 2 in this example connects to two virtual PCs, namely, Virtual PC 1 and Virtual PC 3, and the connection time is 2 minutes or less for each of the two virtual PCs, which means that User 2 meets all conditions written in the parameter table 4340. The state determination unit 430 in this case determines that the user environment of User 2 is not proper. When every user environment works properly, this flow is ended.

When there is a user environment that is not proper, the state determination unit 430 instructs the information transmission unit 450 to transmit inquiry information about user environment initialization to the terminal 100 in order to initialize the user environment (Step S208). The information transmission unit 450 transmits the information to the terminal 100 (Step S209).

The inquiry information about user environment initialization is received by the user inquiry unit 140 of the terminal 100. The user inquiry unit 140 makes an inquiry to the end user about whether the user environment is to be initialized (Step S210). When the end user refuses user environment initialization, the flow is ended (Step S211).

When the end user assents to user environment initialization, the user inquiry unit 140 instructs the information transmission unit 130 to transmit a user environment initialization request to the user environment management server 500 in order to initialize the user environment (Step S212). The information transmission unit 130 transmits the user environment initialization request to the user environment management server 500 (Step S213).

Information of the user environment initialization request is received by the user environment processing unit 530 of the user environment management server 500. The user environment processing unit 530 initializes the user environment, and the flow is ended (Step S214).

As described above, according to the second embodiment, a user environment that does not work is automatically identified, and an end user himself or herself can decide whether to initialize the user environment. This is accomplished by detecting the fact that a user environment is not working from the history of connection to virtual PCs, and prompting the end user to make a decision. Generally speaking, any virtual PC to which an end user using a user environment that does not work connects does not operate properly. The connection time of this end user is therefore expected to be short whichever virtual PC is connected. Based on this finding, the system according to the second embodiment determines whether a user environment has a problem by checking for a combination of a virtual PC and an end user that has a short connection time.

Third Embodiment

A computer system 3 according to a third embodiment of the invention is described. In the computer system 3, blocks having functions that correspond to the functions of the blocks in the computer systems 1 and 2 are denoted by the same reference symbols. A description on a block of the computer system 3 that operates the same way as a corresponding block in the computer systems 1 and 2 may be omitted.

Figure 12:
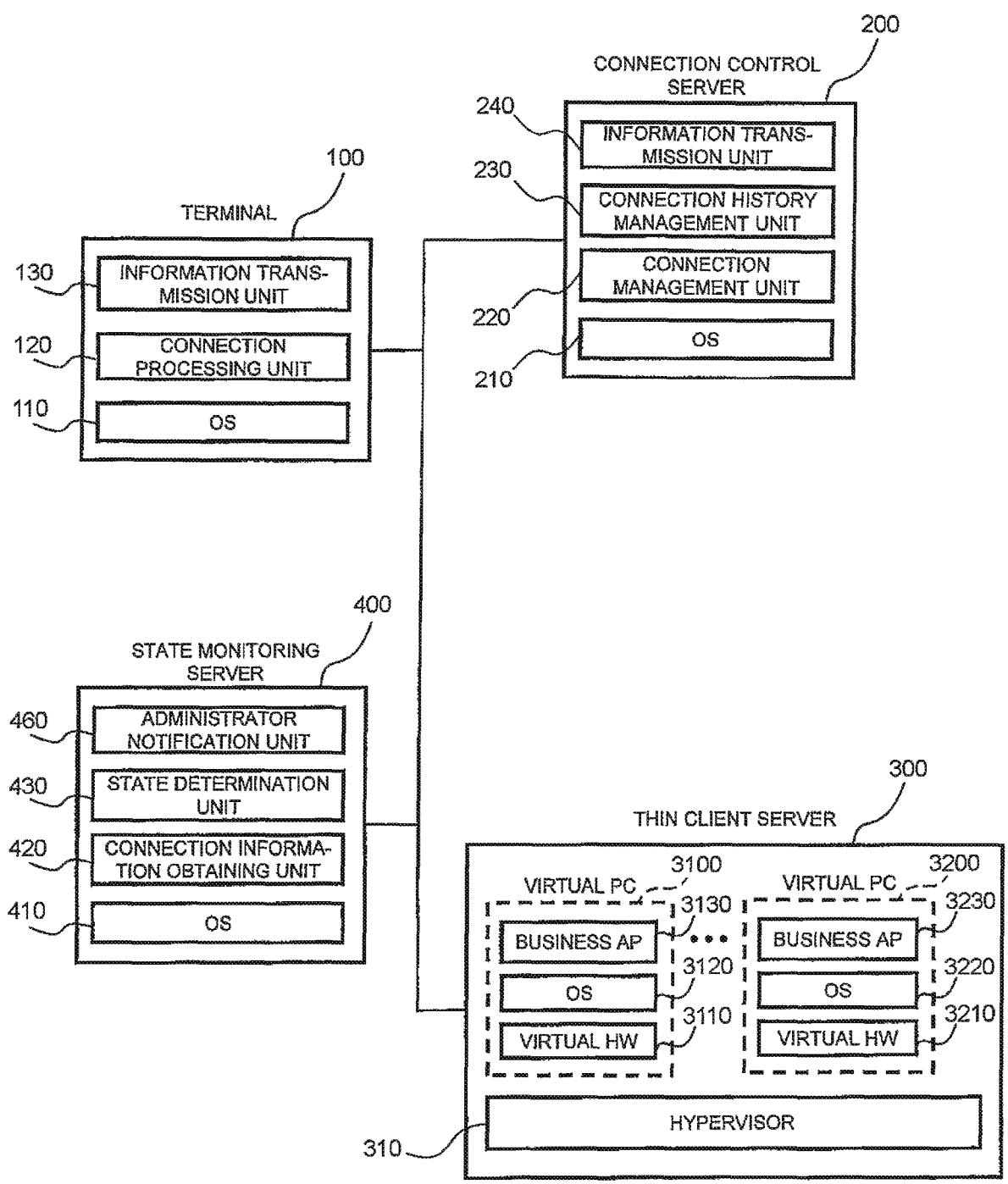
FIG. 12 is a block diagram of a computer system 3 according to a third embodiment of the invention.

As illustrated in FIG. 12, the computer system 3 includes the terminal 100, the connection control server 200, the thin client server 300, and the state monitoring server 400.

The connection control server 200 holds a connection history table 2330 in the connection history management unit 230. The connection history table 2330 is a table for managing connection information about connection from a terminal to a virtual PC. In the example of FIG. 13, User 2 who uses the terminal 100 begins connection to Virtual PC 1 at 9:00 on May 1st, and the connection time is 1 minute (that is, the connection is ended at 9:01 on May 1st). This connection is already ended at present.

The state monitoring server 400 includes the state determination unit 430. The state determination unit 430 holds a connection time management table 4350, an association management table 4360, and a parameter table 4370 in the storage device.

The state determination unit 430 creates the connection time management table 4350 based on information in the connection history table 2330. The connection time management table 4350 is a table indicating which end user has connected to which virtual PC for how many minutes. When one end user connects to the same virtual PC more than once, information about the latest (last) connection is used in the creation of the connection time management table 4350. For example, a reference to FIG. 14 informs that User 1 has connected to Virtual PC 3 for an hour.

A system administrator or a similar entity creates the association management table 4360 in advance. The association management table 4360 stores information about components of resources on which virtual PCs depend, in particular, hardware resources and network resources. The association management table 4360 of FIG. 15 stores, for each virtual PC, information about three components: a hypervisor or a thin client server on which the virtual PC is run, storage used by the virtual PC, and a network to which the virtual PC belongs. To take Virtual PC 1 as an example, Virtual PC 1 runs on Server 1, data required to run Virtual PC 1 is stored in Storage 1, and Network 1 connects the terminal 100 and Virtual PC 1.

The parameter table 4370 is a table for writing conditions for determining a suspected component. A "suspected component" is a component suspected to be not operating normally. A component that fulfills all conditions written in the parameter table 4370 is determined as a suspected component. For example, the following three conditions, namely, Condition 1, Condition 2, and Condition 3 written in the parameter table 4370 of FIG. 16, are used:

(Condition 1: Minimum User Count)

The number of end users registered in the connection time management table 4350 as users who have connected to a virtual PC associated with a component of interest in the association management table 4360 is equal to or higher than the minimum user count (two users in FIG. 16).

(Condition 2: Minimum Virtual PC Count)

The number of virtual PCs that are associated with a component of interest and that are registered in the association management table 4360 is equal to or higher than the minimum virtual PC count (two virtual PCs in FIG. 16).

(Condition 3: Maximum Connection Time)

The connection time of connection to a virtual PC associated with a component of interest in the association management table 4360 is within a threshold for the maximum connection time (3 minutes in FIG. 16).

The state determination unit 430 has a function of identifying a virtual PC, a user environment, or other components that are not working properly, based on information in the connection time management table 4350 and information in the association management table 4360, and on the parameter table 4370. The state determination unit 430 also has a function of instructing the connection information obtaining unit 420 to execute processing in order to create the connection time management table 4350. The state determination unit 430 also has a function of instructing an administrator notification unit 460 to execute processing in order to issue a notification to the administrator. The state determination unit 430 has the right to access the connection time management table 4350, the association management table 4360, and the parameter table 4370.

The administrator notification unit 460 operates upon instruction from the state determination unit 430, and has a function of issuing a notification to the administrator. The method of notification is not particularly limited. An example of possible methods is to transmit electronic mail in which information to be notified is written to the administrator's electronic mail address, which is registered in advance. In place of electronic mail, or along with electronic mail, a Short Message Service (SMS), an instant message service, or a similar service may be used.

Figure 17:
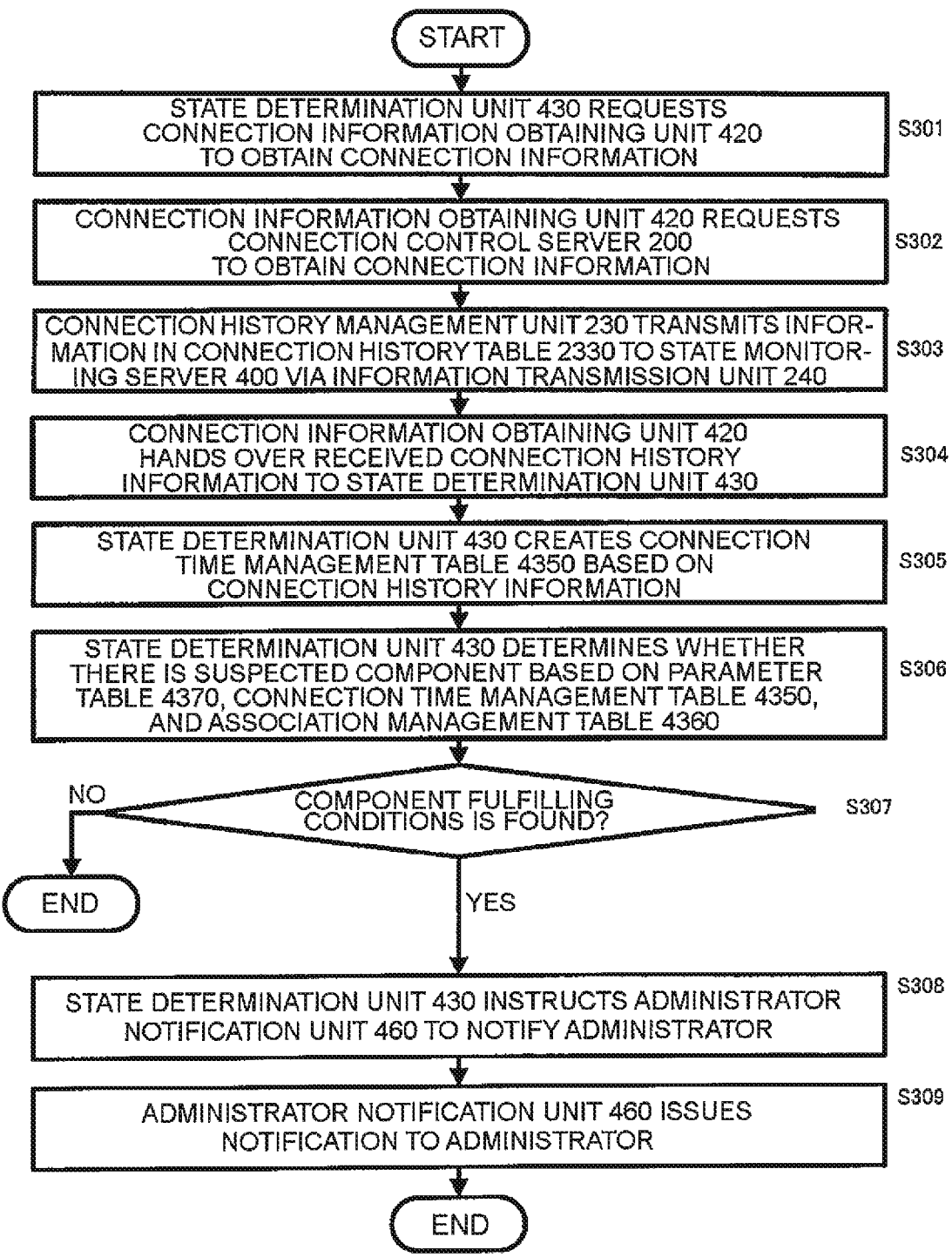
FIG. 17 is a flow chart for illustrating the operation of the computer system 3.

The operation of the computer system 3 is described with reference to FIG. 17. In the computer system 3, a suspected component is identified and notified to the administrator. The computer system 3 executes the operation described below for every given period of time.

The state determination unit 430 requests the connection information obtaining unit 420 to obtain the connection information (Step S301). The connection information obtaining unit 420 requests the connection control server 200 to obtain the connection information (Step S302).

In the connection control server 200, the connection information obtaining request is received by the connection history management unit 230. In response to the received connection information obtaining request, the connection history management unit 230 transmits connection information in the connection history table 2330 to the state monitoring server 400 via the information transmission unit 240 (Step S303).

In the state monitoring server 400, the connection information is received by the connection information obtaining unit 420. The connection information obtaining unit 420 hands over details of the received connection information to the state determination unit 430 (Step S304). The state determination unit 430 uses the received connection information to create the connection time management table 4350 (Step S305). The state determination unit 430 registers, for each combination of an end user and a virtual PC, the connection time of the last connection in the connection time management table 4350.

The state determination unit 430 checks information in the connection time management table 4350 created in Step S305 and information in the association management table 4360 to identify a suspected component from the conditions written in the parameter table 4370 (Step S306). A suspected component is identified based on the fact that, when some component is suspected, the connection time is short only in the connection to a virtual PC associated with the suspected component. For each of a plurality of virtual PCs dependent on the same component to operate and for each user, the connection time of connection between the user and the virtual PC is compared against a given threshold. When the virtual PC has a connection time within the threshold with respect to any user, the component is determined as a suspected component.

To give a more detailed description, the following determination is executed for each component stored in the association management table 4360:

(1) The state determination unit 430 checks whether at least two virtual PCs dependent on the component to operate are registered in the connection time management table 4350 with respect to one user. This corresponds to the value "2" of the "minimum virtual PC count" in the parameter table 4370, and is determined based on the connection time management table 4350. In the case of the connection time management table 4350 of FIG. 14, Virtual PC 1, Virtual PC 2, and Virtual PC 3 fulfill the condition, which means that components associated with the virtual PCs all fulfill the condition.

(2) The state determination unit 430 checks whether there are at least two users whose connection times are recorded with respect to connection to virtual PCs dependent on the component to operate. This corresponds to the value "2" of the "minimum user count" in the parameter table 4370.

For Virtual PC 1, which has "Server 1" as the value of the component "thin client server", connection times of two users, namely, User 2 and User 3, are recorded in the connection time management table 4350. With the connection times of at least two users recorded, Server 1 fulfills the condition (2).

For Virtual PC 3, which has "Network 1" as the value of the component "network", connection times of two users, namely, User 1 and User 2, are recorded in the connection time management table 4350. With the connection times of at least two users recorded, Network 1 fulfills the condition (2).

(3) The state determination unit 430 checks whether the connection time is within 3 minutes with respect to any user. This corresponds to the value "3 minutes" of the "maximum connection time" in the parameter table 4370.

For Virtual PC 1, which has "Server 1" as the value of the component "thin client server", the connection time of User 1 is 1 minute and the connection time of User 2 is 2 minutes in the connection time management table 4350. Each connection time is within 3 minutes, and thus Server 1 fulfills the condition (3).

For Virtual PC 3, which has "Network 1" as the value of the component "network", the connection time of User 1 is an hour and the connection time of User 2 is 5 hours and 30 minutes in the connection time management table 4350. Each connection time exceeds 3 minutes, and thus Network 1 does not fulfill the condition (3).

When there is no suspected component, this flow is ended.

When there is a suspected component, the state determination unit 430 instructs the administrator notification unit 460 to issue a notification to the administrator (Step S308). The administrator notification unit 460 issues the notification to the administrator, and the flow is ended (Step S309).

As described above, according to the third embodiment, an administrator of the thin client system can easily check the soundness of the operation of the entire system, in particular, the soundness of the operation of a virtual PC viewed from an end user. The check in the third embodiment does not require collecting a log for each component of resources from which a virtual PC is built, or determining the soundness for each component, because, in the third embodiment the overall state of the system is determined based on the length of time for which an end user has actually connected to a virtual PC. A more direct determination method that can possibly be employed is to provide a unit for obtaining a log and detecting abnormality for each component. However, this unit is not required according to the third embodiment. The third embodiment can therefore be applied easily to a large-scale or complicate thin client system as well.

In addition, according to the third embodiment, a possible failure in a physical server, a storage device, a network, or others can be identified and notified to the administrator. This is because a component that may be experiencing a failure can be identified from information about which virtual PC has a short connection time, by defining, in advance, which virtual PC is connected (related) to which physical server, which storage, and which network as the association management table 4360.

MODIFICATIONS OF THE EMBODIMENTS

The invention is described above by way of embodiments, but the invention is not limited to the above-mentioned embodiments.

For example, while the connection destination of a terminal is a virtual PC in the embodiments described above, the invention is applicable also when the connection destination is a physical server or a physical client.

A plurality of embodiments out of the embodiments described above may be applied to the same computer system. For instance, the first embodiment and the second embodiment may be applied to the same computer system to determine whether a virtual PC and a user environment both are working properly.

The embodiments described above are not limited to a specific logic for determining a virtual PC, a user environment, or a suspected component that is not working properly. The invention can use various kinds of logic for the determination. Simple determination with the use of a threshold may be employed, or may be combined with, for example, abnormality detection by artificial intelligence (AI) or deep learning.

The computer systems in the embodiments described above each include a connection control server, a state monitoring server, and a user environment management server. The servers may be run on the same server machine.

While the computer systems in the embodiments described above each include one terminal, one connection control server, one thin client server, one state monitoring server, and one user environment management server, the invention can be carried out also when the number of terminals and the numbers of the respective servers are more than 1.

The operation of a system is described as a flow that is executed by the system for every given period of time in the embodiments given above. In place of this operation, or along with this operation, the flow described above may be executed with an end user's action of connecting to a virtual PC as a trigger.

A part of or the entirety of the embodiments given above can also be expressed as, but is not limited to, the following supplementary notes:

(Supplementary Note 1)

A computer system, comprising:
connection destination devices;
a terminal to be connected to one of the connection destination devices to use a function of the one of the connection destination devices;
a measurement device configured to measure, for each combination of one of the connection destination devices and the terminal, a connection time of connection between the one of the connection destination devices and the terminal, to store the connection time in a storage device; and
a determination device configured to determine whether operation of one of the connection destination devices is normal based on the connection time stored in the storage device.

(Supplementary Note 2)

The computer system according to Supplementary Note 1, wherein the connection time includes a length of time of connection between the terminal and one of the connection destination devices that is started last.

(Supplementary Note 3)

The computer system according to Supplementary Note 1, wherein whether operation of a first connection destination device, which is one of the connection destination devices, is normal is determined based on:
a number of terminals that have the connection time stored in the storage device with respect to a combination that includes the first connection destination device; and
the connection time of each combination of the first connection destination device and the terminal.

(Supplementary Note 4)

The computer system according to Supplementary Note 1, wherein the connection destination devices are configured to operate in a first user environment, which is associated with the terminal in advance, and
wherein whether the first user environment is proper is determined based on:
a number of connection destination devices for which the connection time of connection to the terminal associated with the first user environment is stored in the storage device; and
the connection time of each combination of the terminal associated with the first user environment and one of the connection destination devices.

(Supplementary Note 5)

The computer system according to Supplementary Note 1, wherein a combination including a first component on which the connection destination devices are dependent to operate is stored in the storage device in advance for each of the connection destination devices, and
wherein whether operation of the first component is normal is determined based on:
a number of connection destination devices dependent on the first component to operate;
a number of terminals that have the connection time recorded in combination with the connection destination devices dependent on the first component to operate; and
a length of the connection time of each combination of one of the connection destination devices dependent on the first component to operate and the terminal.

(Supplementary Note 6)

The computer system according to Supplementary Note 1, wherein the connection destination devices include virtual machines to be run on a thin client server, and the terminal include a client terminal of the thin client server.

(Supplementary Note 7)

A server machine, comprising:
a measurement device configured to measure, for each combination of one of connection destination devices and a terminal, a connection time of connection between the one of the connection destination devices and the terminal, to store the connection time in a storage device, the terminal being connected to one of the connection destination devices to use a function of the one of the connection destination devices; and
a determination device configured to determine whether operation of one of the connection destination devices is normal based on the connection time stored in the storage device.

(Supplementary Note 8)

The server machine according to Supplementary Note 7, wherein the connection time includes a length of time of connection between the terminal and one of the connection destination devices that is started last.

(Supplementary Note 9)

The server machine according to Supplementary Note 7, wherein whether operation of a first connection destination device, which is one of the connection destination devices, is normal is determined based on:
a number of terminals that have the connection time stored in the storage device with respect to a combination that includes the first connection destination device; and
the connection time of each combination of the first connection destination device and the terminal.

(Supplementary Note 10)

The server machine according to Supplementary Note 7, wherein the connection destination devices are configured to operate in a first user environment, which is associated with the terminal in advance, and
wherein whether the first user environment is proper is determined based on:
a number of connection destination devices for which the connection time of connection to the terminal associated with the first user environment is stored in the storage device; and
the connection time of each combination of the terminal associated with the first user environment and one of the connection destination devices.

(Supplementary Note 11)

The server machine according to Supplementary Note 7, wherein a combination including a first component on which the connection destination devices are dependent to operate is stored in the storage device in advance for each of the connection destination devices, and
wherein whether operation of the first component is normal is determined based on:
a number of connection destination devices dependent on the first component to operate;

a number of terminals that have the connection time recorded in combination with the connection destination devices dependent on the first component to operate; and a length of the connection time of each combination of one of the connection destination devices dependent on the first component to operate and the terminal.

(Supplementary Note 12)

The server machine according to Supplementary Note 7, wherein the connection destination devices include virtual machines to be run on a thin client server, and the terminal include a client terminal of the thin client server.

(Supplementary Note 13)

A program for causing a computer to function as:

a measurement device configured to measure, for each combination of one of connection destination devices and a terminal, a connection time of connection between the one of the connection destination devices and the terminal, to store the connection time in a storage device, the terminal being connected to one of the connection destination devices to use a function of the one of the connection destination devices; and a determination device configured to determine whether operation of one of the connection destination devices is normal based on the connection time stored in the storage device.

(Supplementary Note 14)

The program according to Supplementary Note 13, wherein the connection time includes a length of time of connection between the terminal and one of the connection destination devices that is started last.

(Supplementary Note 15)

The program according to Supplementary Note 13, wherein whether operation of a first connection destination device, which is one of the connection destination devices, is normal is determined based on:

a number of terminals that have the connection time stored in the storage device with respect to a combination that includes the first connection destination device; and the connection time of each combination of the first connection destination device and the terminal.

(Supplementary Note 16)

The program according to Supplementary Note 13, wherein the connection destination devices are configured to operate in a first user environment, which is associated with the terminal in advance, and wherein whether the first user environment is proper is determined based on:

a number of connection destination devices for which the connection time of connection to the terminal associated with the first user environment is stored in the storage device; and the connection time of each combination of the terminal associated with the first user environment and one of the connection destination devices.

(Supplementary Note 17)

The program according to Supplementary Note 13, wherein a combination including a first component on which the connection destination devices are dependent to operate is stored in the storage device in advance for each of the connection destination devices, and wherein whether operation of the first component is normal is determined based on:

a number of connection destination devices dependent on the first component to operate;

a number of terminals that have the connection time recorded in combination with the connection destination devices dependent on the first component to operate; and a length of the connection time of each combination of one of the connection destination devices dependent on the first component to operate and the terminal.

(Supplementary Note 18)

The program according to Supplementary Note 13, wherein the connection destination devices include virtual machines to be run on a thin client server, and the terminal include a client terminal of the thin client server.

(Supplementary Note 19)

A failure detection method, comprising:

measuring, for each combination of one of connection destination devices and the terminal, a connection time of connection between the one of the connection destination devices and the terminal, to store the connection time in a storage device in advance, the terminal being connected to one of the connection destination devices to use a function of the one of the connection destination devices; and determining, by a processing device, whether operation of one of the connection destination devices is normal based on the connection time stored in the storage device.

(Supplementary Note 20)

The failure detection method according to Supplementary Note 19, wherein the connection time includes a length of time of connection between the terminal and one of the connection destination devices that is started last.

(Supplementary Note 21)

The failure detection method according to Supplementary Note 19, wherein whether operation of a first connection destination device, which is one of the connection destination devices, is normal is determined based on:

a number of terminals that have the connection time stored in the storage device with respect to a combination that includes the first connection destination device; and the connection time of each combination of the first connection destination device and the terminal.

(Supplementary Note 22)

The failure detection method according to Supplementary Note 19, wherein the connection destination devices are configured to operate in a first user environment, which is associated with the terminal in advance, and wherein whether the first user environment is proper is determined based on:

a number of connection destination devices for which the connection time of connection to the terminal associated with the first user environment is stored in the storage device; and the connection time of each combination of the terminal associated with the first user environment and one of the connection destination devices.

(Supplementary Note 23)

The failure detection method according to Supplementary Note 19, wherein a combination including a first component on which the connection destination devices are dependent to operate is stored in the storage device in advance for each of the connection destination devices, and wherein whether operation of the first component is normal is determined based on:

a number of connection destination devices dependent on the first component to operate;

a number of terminals that have the connection time recorded in combination with the connection destination devices dependent on the first component to operate; and a length of the connection time of each combination of one of the connection destination devices dependent on the first component to operate and the terminal.

(Supplementary Note 24)

The failure detection method according to Supplementary Note 19, wherein the connection destination devices include virtual machines to be run on a thin client server, and the terminal include a client terminal of the thin client server.

What is claimed is:

1. A thin client system, comprising:
    virtual machines to be run on a thin client server;
    a client terminal to be connected to one of the virtual machines to use a function of the one of the virtual machines;
    a measurement device configured to measure, for each combination of one of the virtual machines and the client terminal, a connection time of connection between the one of the virtual machines and the client terminal, to store the connection time in a storage device; and
    a determination device configured to determine whether operation of one of the virtual machines is normal based on the connection time stored in the storage device.

2. The thin client system according to claim 1, wherein the connection time includes a length of time of connection between the client terminal and one of the virtual machines that is started last.

3. The thin client system according to claim 1, wherein whether operation of a first virtual machine, which is one of the virtual machines, is normal is determined based on:
    a number of client terminals that have the connection time stored in the storage device with respect to a combination that includes the first virtual machine; and
    the connection time of each combination of the first virtual machine and the client terminal.

4. The thin client system according to claim 1,
    wherein the virtual machines are configured to operate in a first user environment, which is associated with the client terminal in advance, and
    wherein whether the first user environment is proper is determined based on:
       a number of virtual machines for which the connection time of connection to the client terminal associated with the first user environment is stored in the storage device; and
       the connection time of each combination of the client terminal associated with the first user environment and one of the virtual machines.

5. The thin client system according to claim 1,
    wherein a combination including a first component on which the virtual machines are dependent to operate is stored in the storage device in advance for each of the virtual machines, and
    wherein whether operation of the first component is normal is determined based on:
       a number of virtual machines dependent on the first component to operate;
       a number of client terminals that have the connection time recorded in combination with the virtual machines dependent on the first component to operate; and
       a length of the connection time of each combination of one of the virtual machines dependent on the first component to operate and the client terminal.

6. A server machine in a thin client system, comprising:
    a measurement device configured to measure, for each combination of one of virtual machines to be run on a thin client server and a client terminal, a connection time of connection between the one of the virtual machines and the client terminal, to store the connection time in a storage device, the client terminal being connected to one of the virtual machines to use a function of the one of the virtual machines; and
    a determination device configured to determine whether operation of one of the virtual machines is normal based on the connection time stored in the storage device.

7. The server machine according to claim 6, wherein the connection time includes a length of time of connection between the client terminal and one of the virtual machines that is started last.

8. The server machine according to claim 6, wherein whether operation of a first virtual machine, which is one of the virtual machines, is normal is determined based on:
    a number of client terminals that have the connection time stored in the storage device with respect to a combination that includes the first virtual machine; and
    the connection time of each combination of the first virtual machine and the client terminal.

9. The server machine according to claim 6,
    wherein the virtual machines are configured to operate in a first user environment, which is associated with the client terminal in advance, and
    wherein whether the first user environment is proper is determined based on:
       a number of virtual machines for which the connection time of connection to the client terminal associated with the first user environment is stored in the storage device; and
       the connection time of each combination of the client terminal associated with the first user environment and one of the virtual machines.

10. The server machine according to claim 6,
    wherein a combination including a first component on which the virtual machines are dependent to operate is stored in the storage device in advance for each of the virtual machines, and
    wherein whether operation of the first component is normal is determined based on:
       a number of virtual machines dependent on the first component to operate;
       a number of client terminals that have the connection time recorded in combination with the virtual machines dependent on the first component to operate; and
       a length of the connection time of each combination of one of the virtual machines dependent on the first component to operate and the client terminal.

11. A failure detection method executed by a server machine in a thin client system, the failure detection method, comprising:
    measuring, for each combination of one of connection destination devices virtual machines to be run on a thin client server and a client terminal, a connection time of connection between the one of the virtual machines and the client terminal, to store the connection time in a storage device in advance, the client terminal being connected to one of the virtual machines to use a function of the one of the virtual machines; and determining, by a processing device, whether operation of one of the virtual machines is normal based on the connection time stored in the storage device.

12. The failure detection method according to claim 11, wherein the connection time includes a length of time of connection between the client terminal and one of the virtual machines that is started last.

13. The failure detection method according to claim 11, wherein whether operation of a first virtual machine, which is one of the virtual machines, is normal is determined based on:
- a number of client terminals that have the connection time stored in the storage device with respect to a combination that includes the first virtual machine; and
- the connection time of each combination of the first virtual machine and client the terminal.

14. The failure detection method according to claim 11, wherein the virtual machines are configured to operate in a first user environment, which is associated with the client terminal in advance, and
wherein whether the first user environment is proper is determined based on:
- a number of virtual machines for which the connection time of connection to the client terminal associated with the first user environment is stored in the storage device; and
- the connection time of each combination of the client terminal associated with the first user environment and one of the virtual machines.

15. The failure detection method according to claim 11, wherein a combination including a first component on which the virtual machines are dependent to operate is stored in the storage device in advance for each of the virtual machines, and
wherein whether operation of the first component is normal is determined based on:
- a number of virtual machines dependent on the first component to operate;
- a number of client terminals that have the connection time recorded in combination with the virtual machines dependent on the first component to operate; and
- a length of the connection time of each combination of one of the virtual machines dependent on the first component to operate and the client terminal.

* * * * *